United States Patent [19]

Koch et al.

[11] 4,032,500

[45] June 28, 1977

[54] CURABLE SEALANT TWO-COMPONENT COMPOSITION CONTAINING BUTYL RUBBER DERIVED FROM ISOOLEFIN AND OPEN-CHAIN CONJUGATED DIOLEFIN

[75] Inventors: Russell William Koch, Hartville; Arthur Eugene Oberster, North Canton, both of Ohio

[73] Assignee: The Firestone Tire & Rubber Company, Akron, Ohio

[22] Filed: Mar. 22, 1976

[21] Appl. No.: 668,880

[52] U.S. Cl. .................. 260/33.6 AQ; 152/330 RF; 152/347; 156/115; 260/33.6 UB; 260/859 R
[51] Int. Cl.² ................... B60C 5/14; B60C 21/08; C08K 5/01; C08L 75/04
[58] Field of Search ............... 260/859 R, 33.6 AQ, 260/33.6 UB; 156/115; 152/330 RF, 347

[56] References Cited

UNITED STATES PATENTS

| | | | |
|---|---|---|---|
| 2,690,780 | 10/1954 | Cousins | 152/349 |
| 2,752,979 | 7/1956 | Knill et al. | 152/347 |
| 2,756,801 | 7/1956 | Iknayan et al. | 152/347 |
| 2,765,018 | 10/1956 | Connell | 152/347 |
| 2,782,829 | 2/1957 | Peterson et al. | 152/347 |
| 2,802,505 | 8/1957 | Peterson et al. | 152/347 |
| 3,042,098 | 7/1962 | Reinowski et al. | 152/347 |
| 3,219,618 | 11/1965 | Freitag | 260/859 R |
| 3,361,698 | 1/1968 | Pace | 156/115 |
| 3,582,508 | 6/1971 | McIntosh | 260/23.7 |
| 3,628,585 | 12/1971 | Pace | 152/347 |
| 3,846,364 | 8/1972 | Criddle et al. | 260/33.6 UB |
| 3,866,651 | 2/1975 | Gomberg | 152/313 |
| 3,914,484 | 10/1975 | Creegan et al. | 260/859 R |
| 3,935,893 | 2/1976 | Stang et al. | 156/115 |

*Primary Examiner*—Donald E. Czaja
*Assistant Examiner*—H. H. Fletcher

[57] ABSTRACT

Curable sealant two-component composition, each component being individually storage-stable and containing oil-extended low molecular weight uncured butyl rubber, said components being mixed together in a volume ratio of from about 1.0 to 1.0.

9 Claims, No Drawings

CURABLE SEALANT TWO-COMPONENT COMPOSITION CONTAINING BUTYL RUBBER DERIVED FROM ISOOLEFIN AND OPEN-CHAIN CONJUGATED DIOLEFIN

BACKGROUND OF THE INVENTION

This invention is directed to a solventless sealant composition, two-component, for use in pneumatic tires containing an air-retaining liner forming an integral part of said tire and for use in inner tubes contained within a tire casing. The sealant composition is applied to the inside of such a tire to function with the integral air-retaining liner to seal any hole that may be formed in said liner by a piercing object, such as a nail. When injected into an inner tube contained within a tire casing, the sealant composition becomes uniformly distributed therein on rotation of the tire.

DESCRIPTION OF THE PRIOR ART

It is known in the prior art to utilize both void-free elastomer fillers, as well as those of prescribed porosity, to completely fill the core of a tire. Such an elastomeric filler is normally derived from a prepolymer of an organic polyisocyanate and polyether or a polyester. In addition to the complete filling of a tire core as heretofore described, various sealant compositions are taught in the art, for example, one-shot recipes containing essentially butyl rubber, active carbon and sulfur as the main sealant ingredients.

It is known to be optional, for example, to utilize a phenol formaldehyde resin to effect a thermosetting cure on the inner portion of a penetrating nail to fix said nail as it has pierced the tire casing and the sealant composition applied therein. It is further known in the art to utilize a self-sealing single-component composition in combination with the inner surface of a pneumatic tire, such a composition containing a partially cured butyl rubber in combination with a curing agent and an auxilliary curing agent such as black iron oxide. Numerous other single-component sealant compositions are known in the art and require a controlled balance of properties to be maintained after application of the sealant to the inner surface of a pneumatic tire, primarily in the adjacent tread and sidewall portions.

DESCRIPTION OF THE INVENTION

In the present invention, each of the two-component mixtures is storage-stable and when mixed together, they are so mixed readily and in a volume ratio of about 1.0 to 1.0 to a homogeneous state. The sealant composition of the present invention is one that can be effectively mixed through, for example, a simple mixing head and applied uniformly therefrom to distribute a desired thickness of sealant layer as applied to the inner surface of a pneumatic tire adjacent primarily to the tread and sidewall areas. This sealant composition can also be injected into an inner tube within a tire casing and be uniformly distributed therein by rotation of said tire and tube. The individual component mixtures, if stored in drums, can be mixed merely by rotating said drums.

DETAILED DESCRIPTION OF THE INVENTION

In the present invention sealant composition, the medium process oil component functions to assist in controlling the viscosity of each individual component to keep said viscosity low to facilitate the processing and use of each component individually, and when mixed together, prior to application to tire inner liner. This oil also functions as a compatibilizing agent for both the butyl rubber, which is uncured, and the polyol component to maintain same compatible in the composition system, the oil remaining as an essential component in the final composition.

A significant feature is one wherein the use and/or need of the transitory prior art volatile solvent is avoided; this feature permits a more controlled application and eliminates the safety hazard normally associated with solvent systems. The sealant composition, as applied from a variable mixing head, requires only a few seconds residence time in the mixing chamber to ensure satisfactory mixing.

The first component mixture is one consisting essentially of 100 parts low molecular weight elastomeric isocyanate terminated prepolymer having from about 3.5 to 4.5% NCO content, from about 250 parts to about 400 parts medium process oil and from about 50 parts to about 70 parts low molecular weight uncured butyl rubber. The second component mixture consists essentially of from about 150 parts to about 250 parts low molecular weight polyol reactant for the prepolymer of the first component, said polyol having about 0.8 milliequivalent per gram hydroxyl; from about 40 to about 65 parts low molecular weight uncured butyl rubber, from about 225 to about 275 parts medium process oil and from about 0.1 to 10.0 parts catalyst for the reaction of the said prepolymer and said polyol.

When these two components, as heretofore described, are mixed, they are so mixed in a volume ratio of about 1.0 to 1.0. In this composition, the mole ratio, optimum, of NCO to OH, is about 0.6 to 1.0; if the mole ratio of NCO to OH is increased to 0.65 to 1.0, the resulting cured sealant shows shorter elongation, loss of tack, slower recovery and poor adhesion to the rubber substrate, and, inadequate sealing at the site of the nail puncture. When this same mole ratio of NCO to OH is decreased to 0.5 to 1, the resulting sealant is undercured and does not function properly.

As stated heretofore, the medium process oil of each individual component functions to (a) maintain a low viscosity essential for ease of processing, (b) establish and maintain a homogeneous system with simple stirring, and, (c) act as a compatibilizing agent for the butyl rubber and the polyol reactant to compatibilize same. The prepolymer and polyol reaction products function to provide a stabilizing matrix to hold in place, uniformly, the sealant composition to ensure availability of the uncured butyl rubber as sealant. After application to the inner surface of a given pneumatic tire, the sealant composition is cured by external heat; it must be recognized however that the butyl rubber remains uncured and is available as a sealant on puncture with, for example, a nail.

It is required that the butyl rubber component be of low molecular weight in the practice of the present invention to maintain a gummy mass that is tacky in nature. High molecular weight butyl rubber, hard butyl rubber, would not be expected to function effectively as a sealant. The particular amount of sealant composition applied to the inner liner of a pneumatic tire can vary and is subject to being determined by routine experimentation to determine that amount required, with a given tire size, to achieve acceptable sealant function.

COMPONENTS

Catalyst

Various catalysts can be used such as those commonly utilized in the curing of polyurethanes. Operable catalysts include dibutyltin dilaurate, diazabicyclooctane, stannous octoate, and combinations thereof. Although dibutyltin dilaurate is preferred, other known catalysts for the curing of polyurethanes can be utilized effectively to achieve substantially the same results.

Medium Process Oil

The medium process oil selected must function to maintain a low viscosity, achieve a homogeneous system on simple stirring and act as a compatibilizing agent for the butyl rubber and the polyol reactant to compatibilize same. The particular medium process oil selected is not critical and can be chosen from a variety of materials and combinations thereof; as a matter of preference, the selected oil should contain a substantial portion of aromatic constituent.

The medium process oil utilized is of the hydrocarbon type, non-functional and of low viscosity, that is a Brookfield viscosity, at 22° C. of about 10 to 500 cps. These oils are readily available under numerous commercial product designations and trade names. Such an oil can be derived from petroleum or coal tar and a description of some of the preferred oils is found in ASTM Specification D2226 with specific reference to Types 101 and 102 listed therein.

The viscosity of the selected medium processing oil should be in the range of from about 100 to 10,000 SUS at 100° F.; a preferred range is 500 to 5,000. The appropriately selected processing oil imparts better flexibility and handling properties during mixing and application of the particular sealant composition into which it has been incorporated.

Low Molecular Weight Polyol

The selected low molecular weight polyol will have a molecular weight within the range of 400 to 5,000; the preferred molecular weight range is from 1200 to 3,000. Mixtures of polyols are included and examples of operable polyol components of low molecular weight that can be utilized are further described in U.S. Pat. No. 3,846,364 which is incorporated by reference at this point.

Low Molecular Weight Uncured Butyl Rubber

The low molecular weight uncured butyl rubber component of the herein described and claimed sealant composition includes rubbery copolymers of a major proportion, i.e., over 50% by weight, of an isoolefin having from 4 to 7 carbon atoms with a minor proportion by weight of an open-chain conjugated diolefin having from 4 to 8 carbon atoms, and preferably a rubbery copolymer of a major proportion of isobutylene with a minor proportion of isoprene.

The viscosity average molecular weight for this low molecular weight butyl rubber will be: (A) Staudinger 5,000 to 15,000; or, Flory 30,000 to 60,000. It is preferred that the copolymer consist of from 70 to 99½ parts by weight of an isomonoolefin such as isobutylene or ethyl methyl ethylene copolymerized with from one half to 30 parts by weight of an open-chain conjugated diolefin such as isoprene; butadiene-1,3; piperylene; 2,3-dimethyl-butadiene-1,3; 1,2-dimethyl-butadiene-1,3 (3-methyl pentadiene-1,3); 1,3-dimethyl butadiene-1,3; 1-ethyl butadiene-1,3 (hexadiene-1,3); 1,4-dimethyl butadiene-1,3 (hexadiene-2,4); the copolymerization being effected by the usual manner of copolymerizing such monomeric materials as is described in more detail in U.S. Pat. Nos. 2,356,128; 2,356,129 and 2,356,130 to Thomas and Sparks. Typical examples of these synthetic rubbers are known to the trade as "GR-I", "Butyl A", "Butyl B", "Butyl C", "Flexon", "GR-150", "GR-115", "GR-117", "GR-118", etc. For purposes of brevity, the copolymer will be referred to herein as "Butyl" rubber.

Low Molecular Weight Isocyanate Terminated PrePolymer

The particular selected isocyanate terminated prepolymer is not critical. Operable prepolymers which can be utilized in the practice of the present invention, and their methods of preparation, are described in U.S. Pat. Nos. 3,628,585 and 3,866,651; the substance of these patent specifications is incorporated by reference at this point.

It will be apparent to those skilled in the art that the present two-component sealant composition results in significant advantages in contrast to the existing compositions found in the prior art. For example, in the makeup and application of the claimed sealant composition, no solvent is required for either component nor is there the need to incorporate a filler as appears required throughout a substantial number of the prior art sealant compositions. In the practice of this invention, simple mixing and simple application to the inner surface of a pneumatic tire to cover the internal tread and sidewall areas result in an effective and uniform sealant composition which is uniformly retained in place with substantially no change in viscosity or performance with age or temperature.

The following Example is representative and illustrates the preferred known method for practicing the present invention at the present time. In this example, all proportions are by weight unless otherwise indicated and the Example can be varied within the total context of the instant specification as comprehended by one skilled in the art to achieve essentially the same results. This Example should not be construed as limiting the scope of the claimed invention.

EXAMPLE

A medium process oil, 329.41 parts of the hydrocarbon type, non-functional and having a Brookfield viscosity at 22° C. of 50 cps was mixed with 65.88 parts low molecular weight butyl rubber having a molecular weight viscosity average of 8,700–10,000 (Staudinger) or 40,000 (Flory), said butyl rubber becoming solubilized in said medium process oil on mixing at 90° to 95° C. To this mixture of uncured butyl rubber solubilized in medium process oil cooled to 50° C. is added 100 parts of low molecular weight isocyanate terminated prepolymer and mixed at 50° C.; the NCO content of the prepolymer was 4.23%; the molecular weight of the prepolymer was from 3,000 to 3,500; these components were thoroughly mixed.

The second component was prepared by mixing 201 parts low molecular weight polyol at 50° C., said polyol having about 0.8 milliequivalent per gram of hydroxyl, into 48.46 parts low molecular weight uncured butyl rubber mixed and solubilized as in component I together with 242.3 parts medium process oil; about 2.29 parts dibutyltin dilaurate catalyst is then added.

The preceding prepared components were storage stable and were thoroughly mixed together in a volume ratio of about 1.0 to 1.0 via a conventional mixing head, and then sprayed onto the inner surface of a pneumatic tire to produce a solventless sealant composition, said tire was then rotated to uniformly distribute the sealant composition onto the inner surface of the tire primarily in the adjacent tread and sidewall areas.

The applied sealant was then cured on the tire inner liner for about 5 to 15 minutes at about 120° C. The thickness of the spray applied sealant was uniform and about one eighth to five sixteenths inch. When punctured by a nail, a small hole was made in the tire tread and the sealant remained stuck at the inner liner and became adhered as well to the nail when inserted and when removed; the resultant puncture became completely sealed.

In the preceding Example, the specified essential components utilized are not critical to the preparation and performance of the sealant composition, but do represent preferred embodiments.

Each of the specified and preferred components can be varied, within the context of the total specification disclosure as comprehended by one skilled in the art, to produce substantially the same results.

A significant feature of the sealant composition of the present invention is that it has acceptable aging properties to thus preserve its integrity after application.

The two-component sealant composition of the present invention has significant utility in any pneumatic tire, from bike sizes to giant off-the-road size, whether the tire utilizes an inner tube or is one of the tubeless variety.

It is understood that the preceding detailed description and representative Example of the present invention is given by way of illustration, the scope of this invention being limited solely by the following claims.

What is claimed is:

1. A curable and solventless sealant composition consisting essentially of a mixture of (a) a mixture of about 100 parts low molecular weight elastomeric isocyanate terminated prepolymer, said prepolymer having from about 3.5 to about 4.5% NCO content, from about 250 parts to about 400 parts medium process oil, said oil having a Brookfield viscosity at 22° C. of about 10 to 500 cps, and from about 50 parts to about 70 parts low molecular weight uncured butyl rubber having a Staudinger molecular weight of 5,000 to 15,000, and, (b) a mixture of from about 150 parts to about 250 parts low molecular weight polyol having a molecular weight of from 400 to 5,000, said polyol having about 0.8 milliequivalent per gram hydroxyl, from about 40 to about 65 parts low molecular weight uncured butyl rubber having a Staudinger molecular weight of 5,000 to 15,000, from about 225 to about 275 parts of a medium process oil as in (a) and from about 0.1 to about 10.0 parts catalyst for the reaction of said prepolymer and said polyol, said (a) and said (b) being mixed together in a volume ratio of from about 1.0 to 1.0.

2. A sealant composition according to claim 1 in combination with the inner surface of a pneumatic tire.

3. A cured sealant composition according to claim 1 in combination with the inner surface of a pneumatic tire, said butyl rubber remaining uncured.

4. A curable and solventless sealant composition consisting essentially of a mixture of (a) a mixture of about 100 parts low molecular weight elastomeric isocyanate terminated prepolymer having about 3.75% NCO content, about 300 parts medium process oil, said oil having a Brookfield viscosity at 22° C. of 50 cps, and about 60 parts low molecular weight uncured butyl rubber having a Staudinger molecular weight of 5,000 to 15,000, and, (b) a mixture of about 180 parts low molecular weight polyol having a molecular weight of from 400 to 5,000 and having about 0.8 milliequivalent per gram hydroxyl, about 45 parts low molecular weight uncured butyl rubber having a Staudinger molecular weight of 5,000 to 15,000, about 230 parts of a medium process oil as in (a) and about 2 parts catalyst for the reaction of said prepolymer and said polyol, said (a) and said (b) being mixed together in a volume ratio of from about 1.0 to 1.0.

5. A sealant composition according to claim 4 in combination with the inner surface of a pneumatic tire.

6. A cured sealant composition according to claim 4 in combination with the inner surface of a pneumatic tire, said butyl rubber remaining uncured.

7. A curable and solventless sealant composition consisting essentially of a mixture of (a) a mixture of about 100 parts low molecular weight polyurethane elastomeric prepolymer having about 3.75% NCO content, about 300 parts medium process oil, said oil having a Brookfield viscosity at 22° C. of 50 cps, and about 60 parts low molecular weight uncured butyl rubber having a Staudinger molecular weight of 5,000 to 15,000, and, (b) a mixture of about 80 grams low molecular weight polyol having a molecular weight of from 400 to 5,000 and having about 0.8 milliequivalent per gram hydroxyl, about 45 parts low molecular weight uncured butyl rubber having a Staudinger molecular weight of 5,000 to 15,000, about 230 parts of a medium process oil as in (a) and about 2 grams dibutyltin dilaurate as catalyst for the reaction of said prepolymer and said polyol, said (a) and said (b) being mixed together in a volume ratio of from about 1.0 to 1.0.

8. A sealant composition according to claim 7 in combination with the inner surface of a pneumatic tire.

9. A cured sealant composition according to claim 7 in combination with the inner surface of a pneumatic tire, said butyl rubber remaining uncured.

* * * * *